US008923457B2

United States Patent
Qian et al.

(10) Patent No.: US 8,923,457 B2
(45) Date of Patent: Dec. 30, 2014

(54) METHOD AND SYSTEM FOR PILOT-BASED TIME DOMAIN PHASE NOISE MITIGATION FOR COHERENT RECEIVER

(71) Applicant: NEC Laboratories America, Inc., Princeton, NJ (US)

(72) Inventors: Dayou Qian, Princeton, NJ (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 13/855,168

(22) Filed: Apr. 2, 2013

(65) Prior Publication Data

US 2013/0259174 A1 Oct. 3, 2013

Related U.S. Application Data

(60) Provisional application No. 61/618,898, filed on Apr. 2, 2012.

(51) Int. Cl.
| | | |
|---|---|---|
| H04B 10/2507 | (2013.01) | |
| H04L 7/00 | (2006.01) | |
| H04L 27/26 | (2006.01) | |
| H04L 27/227 | (2006.01) | |
| H04L 27/22 | (2006.01) | |
| H04B 10/00 | (2013.01) | |
| H04B 10/61 | (2013.01) | |
| H04L 27/00 | (2006.01) | |

(52) U.S. Cl.
CPC .............. *H04L 7/0079* (2013.01); *H04L 27/26* (2013.01); *H04L 27/2272* (2013.01); *H04B 10/6165* (2013.01); *H04L 27/223* (2013.01); *H04L 27/2657* (2013.01); *H04L 27/2671* (2013.01); *H04L 27/2675* (2013.01); *H04L 27/2697* (2013.01); *H04L 2027/0026* (2013.01); *H04B 2210/075* (2013.01)
USPC ............ 375/346; 375/316; 398/208; 398/202

(58) Field of Classification Search
CPC ..... H04B 17/0055; H04B 7/02; H04I 7/0079; H04L 2027/0026; H04L 27/2272
USPC .......... 375/346, 316, 347, 348; 398/115, 202, 398/208, 211
See application file for complete search history.

(56) References Cited

U.S. PATENT DOCUMENTS

| | | | | |
|---|---|---|---|---|
| 5,684,836 | A * | 11/1997 | Nagayasu et al. | 375/326 |
| 7,227,834 | B1 * | 6/2007 | Barton et al. | 370/208 |
| 2008/0225170 | A1 * | 9/2008 | Silver et al. | 348/555 |
| 2012/0155887 | A1 * | 6/2012 | Youn et al. | 398/182 |

OTHER PUBLICATIONS

Dayou Qian; Ming-Fang Huang; Ip, E.; Yue-Kai Huang; Yin Shao; Junqiang Hu; Ting Wang, "101.7-Tb/s (370×294-Gb/s) PDM-128QAM-OFDM transmission over 3×55-km SSMF using pilot-based phase noise mitigation," Optical Fiber Communication Conference and Exposition (OFC/NFOEC), 2011 and the National Fiber Optic Engineers Conference , vol., no., pp. 1,3, 6-10.*

Jha et al., OFDM Towards Fixed and Mobile Broadband Wireless Access, 2007, Artech House, Chapter 2, pp. 29-58.*

* cited by examiner

*Primary Examiner* — Chieh M Fan
*Assistant Examiner* — Michelle M Koeth
(74) *Attorney, Agent, or Firm* — Joseph Kolodka

(57) ABSTRACT

A method for phase noise mitigation for a coherent receiver in either an OFDM or single carrier based transmission system including applying a frequency offset and coarse phase noise compensation based on a radio frequency RF tone or using a phase lock loop PLL m-th power procedure, responsive to a signal from a digital signal processed transmission with an added pilots signal over an optical system, applying fine phase noise compensation based on comparison of the pilots signal in a time domain, removing the pilots, and demodulating the remaining pilotless signal.

4 Claims, 4 Drawing Sheets

US 8,923,457 B2

METHOD AND SYSTEM FOR PILOT-BASED TIME DOMAIN PHASE NOISE MITIGATION FOR COHERENT RECEIVER

RELATED APPLICATION INFORMATION

This application claims priority to provisional application No. 61/618,898 filed Apr. 2, 2012, the contents thereof are incorporated herein by reference

BACKGROUND OF THE INVENTION

The present invention relates generally to coherent receivers, and more particularly, to a pilot-based time domain phase noise mitigation for a coherent receiver.

One main challenge with using a coherent detector is its sensitivity for laser phase noise (PN) and nonlinear impairments. Laser phase noise is caused by the uncorrelated local oscillator (LO) laser. The unstable wavelength difference between the LO and the signal behaves like a random phase noise for the received signal of the coherent receiver. The fiber non-linearity phase noise is mainly caused by the self-phase modulation (SPM) and Cross-phase modulation (XPM). Those distortions will contribute both to the phase and amplitude of the received signal. The overall phase noise at the coherent receiver is one of the major limitations of transmission system.

In one prior effort, an orthogonal basis expansion based method to suppress both common phase error (CPE) and the partial ICI for CO-OFDM systems is proposed. However, this proposed method requires an accurate channel matrix to reduce the phase noise which may not be available before the phase noise is completely removed. Other prior works used pilots to estimate phase noise in frequency domain, but they could only find CPE. In another prior work, an RF tone pilot was used to reduce the phase noise within one OFDM symbol, but there was some residual phase noise left. A further prior work used optical phase lock loop to reduce the phase noise, but the system complexity and cost would higher due to the feedback circuit.

Accordingly, there is a need for a phase noise mitigation for a coherent receiver that improves on the shortcomings of prior efforts.

BRIEF SUMMARY OF THE INVENTION

The present invention is directed to a method for phase noise mitigation for a coherent receiver in either an OFDM or single carrier based transmission system including applying a frequency offset and coarse phase noise compensation based on a radio frequency RF tone or using a phase lock loop PLL m-th power procedure, responsive to a signal from a digital signal processed transmission with an added pilots signal over an optical system, applying fine phase noise compensation based on comparison of the pilots signal in a time domain, removing the pilots, and demodulating the remaining pilotless signal.

In a similar aspect of the invention, a system for phase noise mitigation for a coherent receiver in either an OFDM or single carrier based transmission system includes a frequency offset and coarse phase noise compensation based on a radio frequency RF tone or using a phase lock loop PLL m-th power procedure applied to a signal from a digital signal processed transmission with an added pilots signal over an optical system, a fine phase noise compensation based on comparison of the pilots signal in a time domain, a filter for removing the pilots, and a demodulator for demodulating the remaining pilotless signal.

These and other advantages of the invention will be apparent to those of ordinary skill in the art by reference to the following detailed description and the accompanying drawings.

DETAILED DESCRIPTION

The present invention is directed to reducing phase noise by two steps: 1) for a multi-carrier (OFDM) system, step i): an RF-tone is used to remove frequency offset and to perform coarse carrier recovery, and step ii): the received pilot sub-carriers are filtered out and compared with the transmitted pilots in time domain to estimate carrier phase fluctuation; and 2) for a single-carrier system, step i): phase-lock loop (PLL) or an m-th power algorithm is used to remove frequency offset and to perform coarse carrier recovery, and step ii) the received pilot subcarriers are filtered out and compared with the transmitted pilots in time domain to estimate carrier phase fluctuation.

Figure 1:
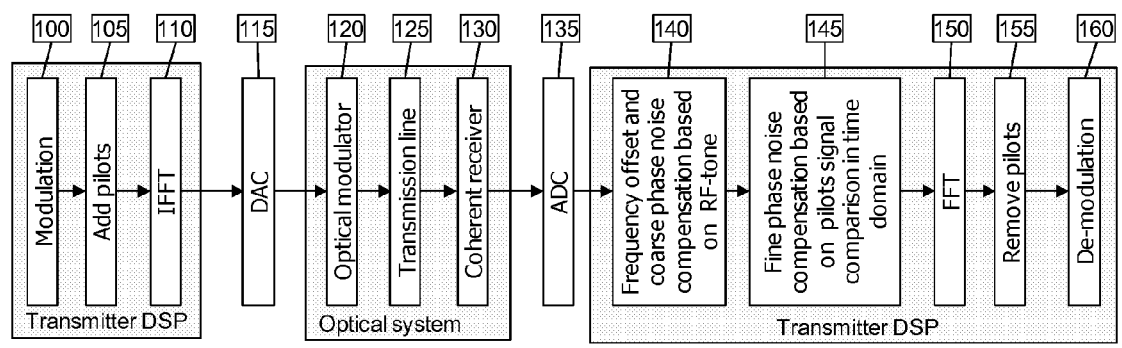
FIG. 1 is an exemplary diagram of an orthogonal frequency division multiplexing OFDM transmission system with pilot based phase noise mitigation, in accordance with the invention.

Turning now to the diagram of FIG. 1, there is shown an exemplary diagram of an orthogonal frequency division multiplexing OFDM transmission system with pilot based phase noise mitigation, in accordance with the invention. A digital signal processor DSP transmitter, with modulation 100, add pilots 105 and inverse fast Fourier transform IFFT 110 functions, is coupled to a digital-to-analog converter DAC 115. Output from the DAC 115 goes to an optical system, with an optical modular 120, transmission line 125, and a coherent receiver 130, which is tied to an analog-to-digital converter ADC 135. Output from the ADC 135 goes to a transmitter DSP with the following functions: a frequency offset and coarse phase noise compensation based on radio frequency Rf tone 140, a fine phase noise compensation based on pilots signal comparison in time domain 145, a fast Fourier transform FFT 150, removal of pilots 155, and demodulation 160.

In the inventive pilot-based phase noise mitigation, because the data needs to be modulated to different sub-carriers in frequency domain, some pilots interleaved with data sub-carriers can be added. Similarly, the optical carrier in the middle of the OFDM sub-carriers can be easily isolated from all other data and pilots sub-carriers so that the optical carrier can be filtered out as an RF tone to compensate the frequency offset and coarse phase noise compensation. Next, the pilot sub-carriers are filtered out with multi-band filters and compared with the original pilots signal in time domain to find the remained phase noise, so the fine phase noise compensation can be done after that.

Figure 2:
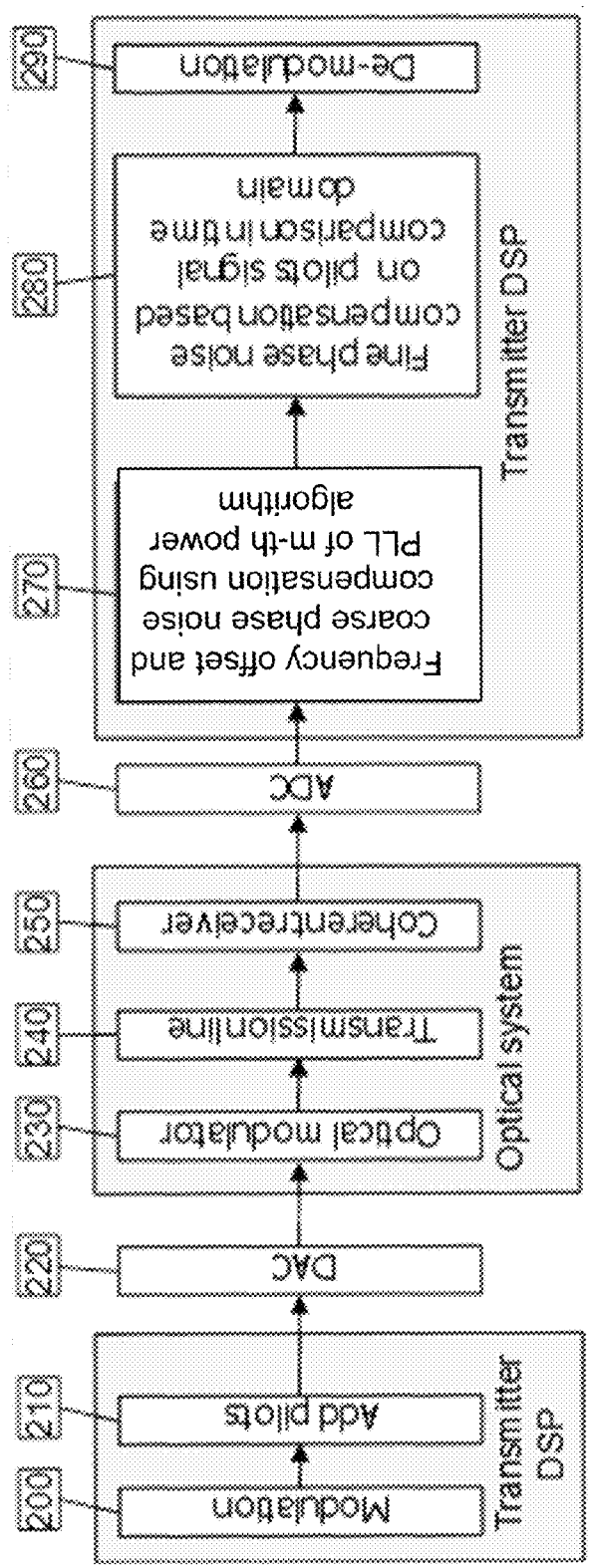
FIG. 2 is an exemplary diagram of a single-carrier transmission system with pilot based phase noise mitigation, in accordance with the invention.

Turning now to the diagram of FIG. 2, there is shown exemplary diagram of a single-carrier transmission system with pilot based phase noise mitigation, in accordance with the invention. A digital signal processor DSP transmitter, with modulation 200, and addition of pilots 210 functions, is coupled to a digital-to-analog converter DAC 220. Output from the DAC 220 goes to an optical system, with an optical modular 230, transmission line 240, and a coherent receiver 250, which is tied to an analog-to-digital converter ADC 260. Output from the ADC 260 goes to a transmitter DSP with the following functions: a frequency offset and coarse phase noise compensation using phase lock loop PLL or m-th power algorithm 270, a fine phase noise compensation based on pilots signal comparison in time domain 280, and demodulation 290.

Considering the spectral shape of a single-carrier signal, the pilots can be only be added in the higher frequency range. Also, the DAC and ADC bandwidth have to be enough to transmit and receive the pilot signals. At the receiver side, the frequency offset and coarse phase noise can be removed by the traditional PLL or/and m-th power algorithm. Following that, the pilot signal can be filtered out by high-pass filters and compared with the original pilot signals in time domain to find the remained phase noise.

Figure 3:
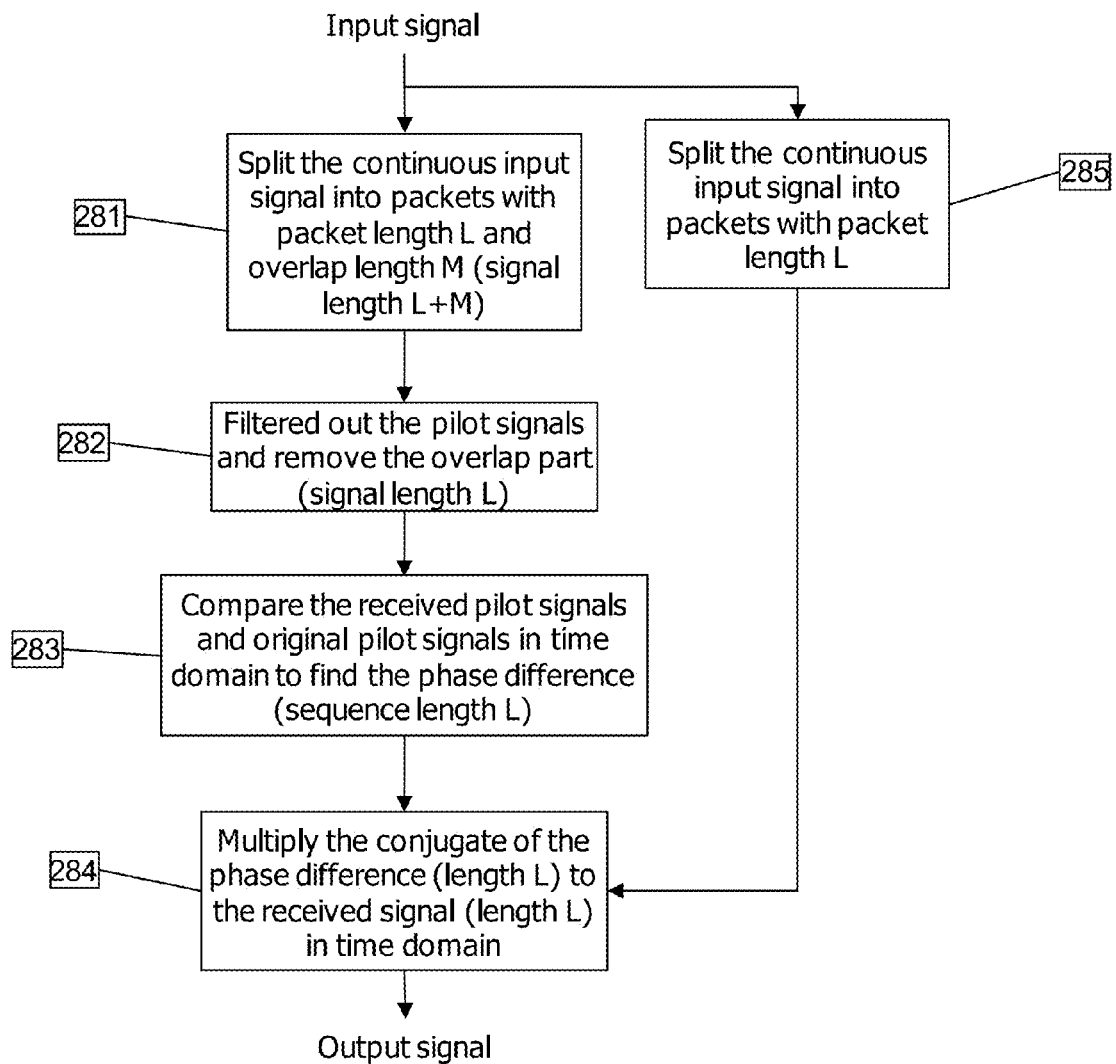
FIG. 3 is a diagram detailing the functional aspects of a fine noise compensation module, in accordance with the invention.

Referring to FIG. 3, there is shown a diagram detailing the functional aspects of a fine noise compensation module, in accordance with the invention. The input signal needs to be split into packets first 281. Each packet contains L signals and M overlap at the beginning. Then the packet is passed through a multi-band filter so that only the pilots are filtered out 282. The overlap length M needs to be equal or larger than the filter length. By comparing the received pilot signals and the original pilot signals in time domain, the phase difference could be found 283. Then the conjugate of the phase difference can be multiplied to the received signal (length L) to remove the remained phase noise from the previous step 284.

Figure 4:
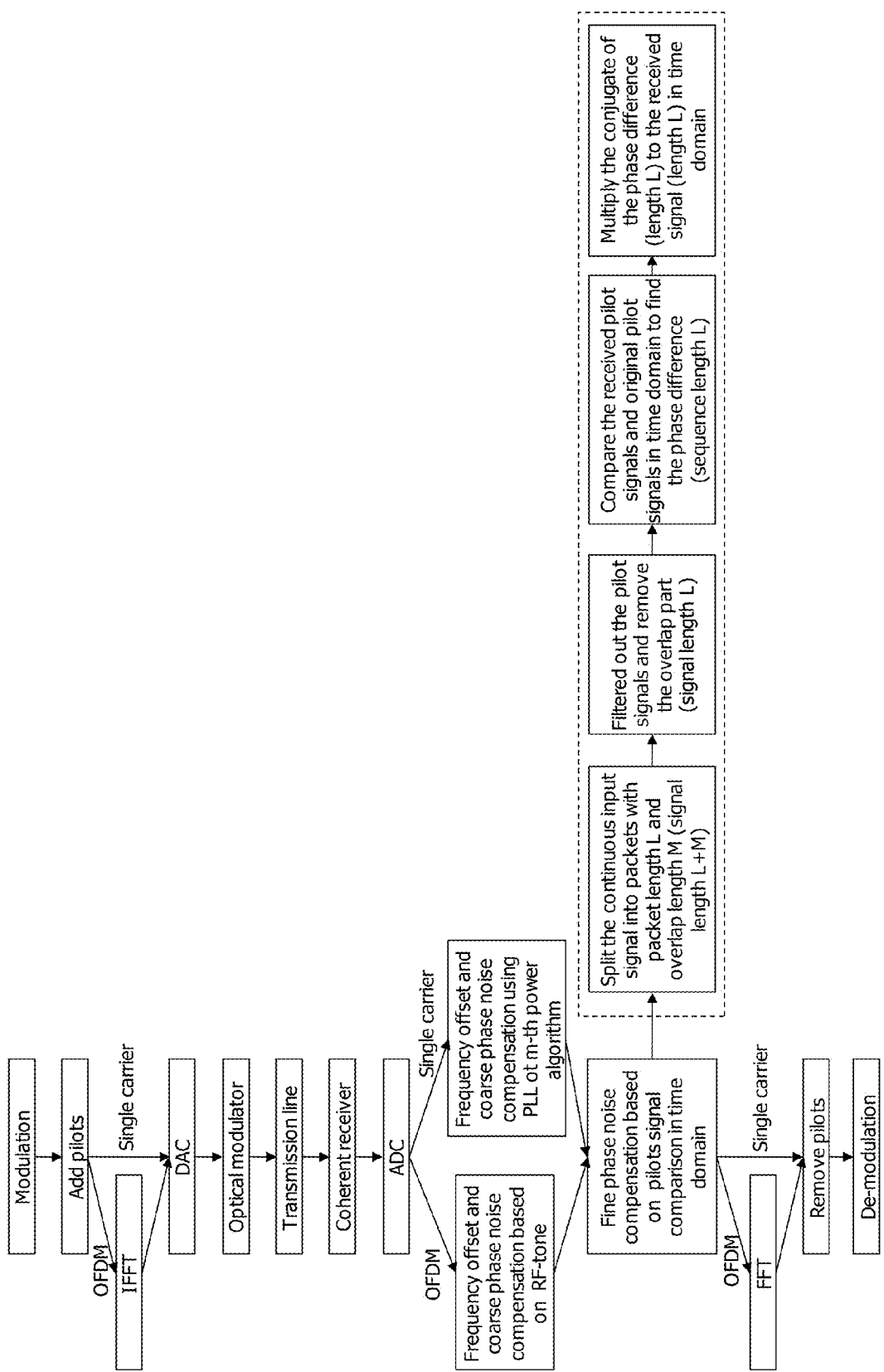
FIG. 4 is a block diagram of an overview of key aspects of the present invention.

Referring now to FIG. 4, a block diagram of an overview of key aspects of the present invention is shown. In either an OFDM or single carrier transmission system, fine phase noise compensation is based on pilots signal comparison the time domain, followed by a splitting of the continuous input signal into packets with packet length L and overlap M (signal length is L+M). Then there is a filtering out of the pilot signals and removal of the overlap part, followed by a comparing of the received pilot signals and original pilot signals in the time domain to find the phase difference (sequence length L). Lastly, there is a multiplying of the conjugate of the phase difference (length L) to the received signal (length L) in the time domain. Upon completion of the above fine phase noise steps, the pilots are removed and demodulation is undertaken on the signal without the pilots.

From the foregoing it can be appreciated that, compared with other solutions, the invention can provide better phase noise mitigation so that most of the laser phase noise and partial fiber non-linearity phase noise can be eliminated. Also, the performance of the coherent receiver can be improved.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for phase noise mitigation for a coherent receiver in either an OFDM or single carrier based transmission system comprising the steps of:
    applying a frequency offset and coarse phase noise compensation based on a radio frequency RF tone or using a phase lock loop PLL m-th power procedure, responsive to a received signal from a digital signal processed transmission with an added pilots signal over an optical system,
    applying a fine phase noise compensation to the received signal based on comparison of the pilots signal in a time domain by:
        splitting the received signal into packets, each packet having a length L and overlap length M at a packet beginning,
        passing each packet through a multi-band filter to filter out the pilot signals, wherein the overlap length M is at least equal to a filter length,
        comparing the received pilot signals and the original transmitted added pilot signals in the time domain to determine the phase difference sequence having the length L, and
        multiplying of a conjugate of the phase difference sequence to the received signal having the length L in the time domain;
    removing the pilots from the fine phase noise compensated received signal; and
    demodulating the remaining pilotless signal.

2. The method of claim 1, wherein said fine phase noise compensation further comprises removing the overlap length.

3. A system for phase noise mitigation for a coherent receiver in either an OFDM or single carrier based transmission system, said system comprising:
    a digital signal processor implementing the following functions:
        a frequency offset and coarse phase noise compensation based on a radio frequency RF tone or using a phase lock loop PLL m-th power procedure applied to a received signal from a digital signal processed transmission with an added pilots signal over an optical system,
        a fine phase noise compensation to the received signal based on comparison of the pilots signal in a time domain by:
            splitting the received signal into packets, each packet having a length L and overlap length M at a packet beginning,
            passing each packet through a multi-band filter to filter out the pilot signals, wherein the overlap length M is at least equal to a filter length,
            wherein phase difference is determined by comparing the received pilot signals and the original transmitted added pilot signals in the time domain to determine the phase difference sequence having the length L, and
            multiplying of a conjugate of the phase difference sequence to the received signal having the length L in the time domain;
    a filter for removing the pilots from the fine phase noise compensated received signal; and
    a demodulator for demodulating the remaining pilotless signal.

4. The method of claim 3, wherein said fine phase noise compensation further comprises removing the overlap length.

* * * * *